United States Patent
Sabet et al.

(10) Patent No.: US 11,887,067 B2
(45) Date of Patent: Jan. 30, 2024

(54) SYSTEM AND METHODS FOR INTERNATIONAL ACH TRANSACTIONS

(71) Applicant: MASTERCARD INTERNATIONAL INCORPORATED, Purchase, NY (US)

(72) Inventors: Mostafa Hussein Sabet, Greenwich, CT (US); Martin Hargreaves, High Wycombe (GB); Shanthan Subramaniam, Baldwin Place, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 555 days.

(21) Appl. No.: 16/123,404

(22) Filed: Sep. 6, 2018

(65) Prior Publication Data
US 2020/0082356 A1 Mar. 12, 2020

(51) Int. Cl.
*G06Q 20/02* (2012.01)
*G06Q 20/10* (2012.01)

(52) U.S. Cl.
CPC ......... *G06Q 20/023* (2013.01); *G06Q 20/108* (2013.01)

(58) Field of Classification Search
CPC .......................... G06Q 20/023; G06Q 20/108
See application file for complete search history.

(56) References Cited

U.S. PATENT DOCUMENTS

| | | | | |
|---|---|---|---|---|
| 7,881,996 B1 * | 2/2011 | Schulz | ................... | G06Q 40/02 705/40 |
| 2001/0034682 A1 * | 10/2001 | Knight | ................... | G06Q 40/06 705/35 |
| 2014/0019341 A1 * | 1/2014 | Frohwein | ............... | G06Q 20/02 705/39 |
| 2015/0278776 A1 * | 10/2015 | Murray | .................. | G06Q 20/28 705/39 |
| 2017/0286990 A1 * | 10/2017 | Kikuchi | ................. | G06Q 40/04 |
| 2017/0352018 A1 * | 12/2017 | Cooper | .................. | G06Q 20/28 |

(Continued)

OTHER PUBLICATIONS

"Chinese First Office Action" dated Mar. 16, 2023 (dated Mar. 16, 2023), Chinese Intellectual Property Administration (CCPIT), for Chinese Application No. 201910843481.5, 7pgs.

(Continued)

*Primary Examiner* — Neha Patel
*Assistant Examiner* — Nicholas K Phan
(74) *Attorney, Agent, or Firm* — Buckley, Maschoff & Talwalkar LLC

(57) ABSTRACT

A method includes receiving a first ACH (automated clearing house) transaction at a local (domestic) sponsor bank. The first ACH transaction originates from a domestic originating bank. In response to the first ACH transaction, a second ACH transaction is executed from the local sponsor bank to a foreign sponsor bank. The second ACH transaction includes addressing messaging. The addressing messaging indicates a receiving bank in the same country as the foreign sponsor bank. The receiving bank is designated to receive a third ACH transaction from the foreign sponsor bank to benefit a recipient's account at the receiving bank. The addressing messaging contains an account number to identify the recipient's account.

11 Claims, 7 Drawing Sheets

(56) References Cited

U.S. PATENT DOCUMENTS

2018/0060837 A1* 3/2018 Blignaut ................ G06Q 20/10
2019/0139005 A1* 5/2019 Piel ........................ G06Q 20/40
2019/0289019 A1* 9/2019 Thekadath ............ H04L 9/3239
2020/0175496 A1* 6/2020 Finke ................. G06Q 20/3274

OTHER PUBLICATIONS

English-language Translation of "Chinese First Office Action" dated Mar. 16, 2023 (dated Mar. 16, 2023), Chinese Intellectual Property Administration (CCPIT), for Chinese Application No. 201910843481.5, 6pgs.

* cited by examiner

SYSTEM AND METHODS FOR INTERNATIONAL ACH TRANSACTIONS

BACKGROUND

FIG. 1 is a block diagram illustrating a known international funds transfer system 100.

For purposes of FIG. 1, it is assumed that a funds transfer is to be made from a sender's account at an originating depository financial institution (ODFI) 102 to a recipient's account at a receiving depository financial institution (RDFI) 104. It is further assumed that the ODFI 102 and the RDFI 104 are in different countries from each other (say, respectively, in Country A and Country B). Informational messaging regarding the transaction occurs via the well-known SWIFT (Society for Worldwide Interbank Financial Telecommunications) system 106. However, actual settlement of the funds transfer does not occur via the SWIFT system 106. For settlement the ODFI 102 and the RDFI 104 rely on a suitable correspondent banking arrangement (schematically represented at block 108). Settlement via correspondent banks is neither quick nor transparent.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments, wherein.

DETAILED DESCRIPTION

Figure 1:
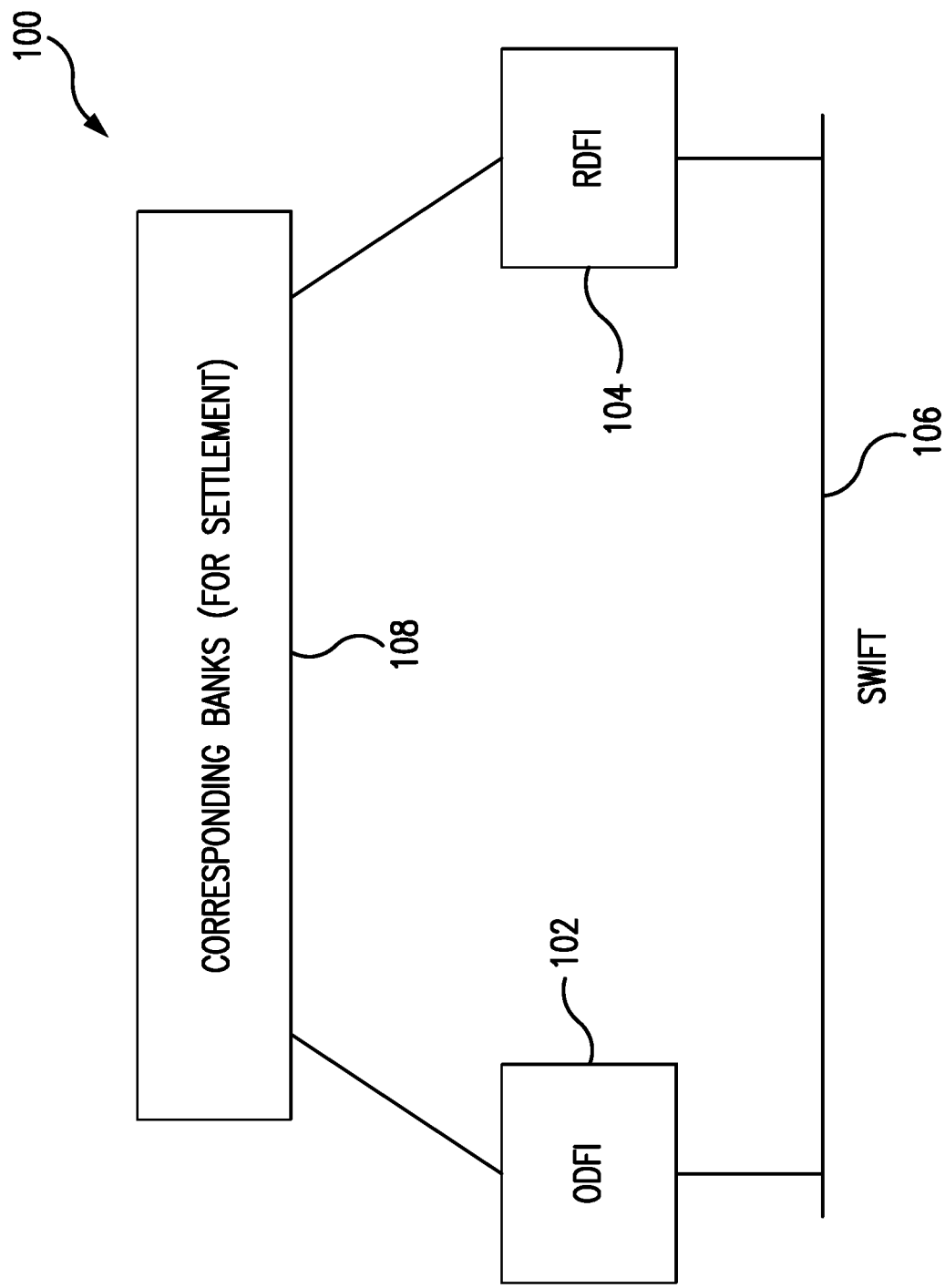
FIG. 1 is a block diagram illustrating a known international funds transfer system.

In general, and for the purpose of introducing concepts of novel embodiments described herein, an international ACH system handles both transaction messaging and settlement of transactions. In cases where the ODFI and RDFI are not members of the international ACH system, each is involved in a local (domestic) ACH transaction with a local sponsor bank that is a member of the international ACH system. The sponsor banks provide transaction forwarding services such that three successive ACH transactions (domestic—ODFI country; cross-border; and domestic—RDFI country) bring about the desired funds transfer from the sender's account at the OFDI to the recipient's account at the RDFI. In other use cases only one sponsor bank is involved, or none is.

With an international ACH system as described herein, cross-border funds transfer settlement may be performed without the inconvenience and cost involved in correspondent bank settlements. In addition, the international ACH system as described herein provides greater speed and transaction visibility than existing correspondent bank settlements.

Throughout this disclosure, examples of financial transactions will be described, which are not to be taken as limiting. In addition, a number of terms will be used, the use of which terms is not intended to be limiting, but rather the terms are used for convenience and ease of exposition. For example, as used herein, the term "user" may be used interchangeably with the term "consumer" and/or the with the term "cardholder" and these terms are used herein to refer to a person, individual, consumer, customer, company, business or other entity that owns (or is authorized to use) a financial account such as a bank account (i.e., a savings account and/or a checking account) or payment card account (i.e., a credit card account, debit card account, or pre-paid card account) or some other type of financial account (such as a brokerage account, loyalty card account, and/or mass transit access account). In addition, the term "payment card account" may include a credit card account, a debit card account, and/or a deposit account or other type of financial account that an account holder or cardholder may access. The term "payment card account number" includes a number that identifies a payment card system account or a number carried by a payment card, and/or a number that is used to route a transaction in a payment system that handles debit card and/or credit card transactions and the like. Moreover, as used herein the terms "payment card system" or "payment card account system" refer to a system and/or network for processing and/or handling purchase transactions and related transactions, which may be operated by a payment card system operator such as Mastercard International Incorporated (the assignee hereof), or a similar system. In some embodiments, the term "payment card system" may be limited to systems in which member financial institutions (such as banks) issue payment card accounts to individuals, businesses and/or other entities or organizations (and thus are known as issuer financial institutions or issuer banks). In addition, the terms "payment card system transaction data" and/or "payment card network transaction data" or "payment card transaction data" refer to transaction data associated with payment or purchase transactions that have been or are being processed over and/or by a payment card network or payment card account system. For example, payment card system transaction data may include a number of data records associated with individual payment transactions (or purchase transactions) of cardholders that have been processed over a payment card system or payment card network. In some embodiments, payment card system transaction data may include information such as data that identifies a cardholder, data that identifies a cardholder's payment device and/or payment card account, transaction date and time data, transaction amount data, an indication of the merchandise or services that have been purchased, and information identifying a merchant and/or a merchant category. Additional transaction details and/or transaction data may also be available and/or utilized for various purposes in some embodiments.

Figure 2:
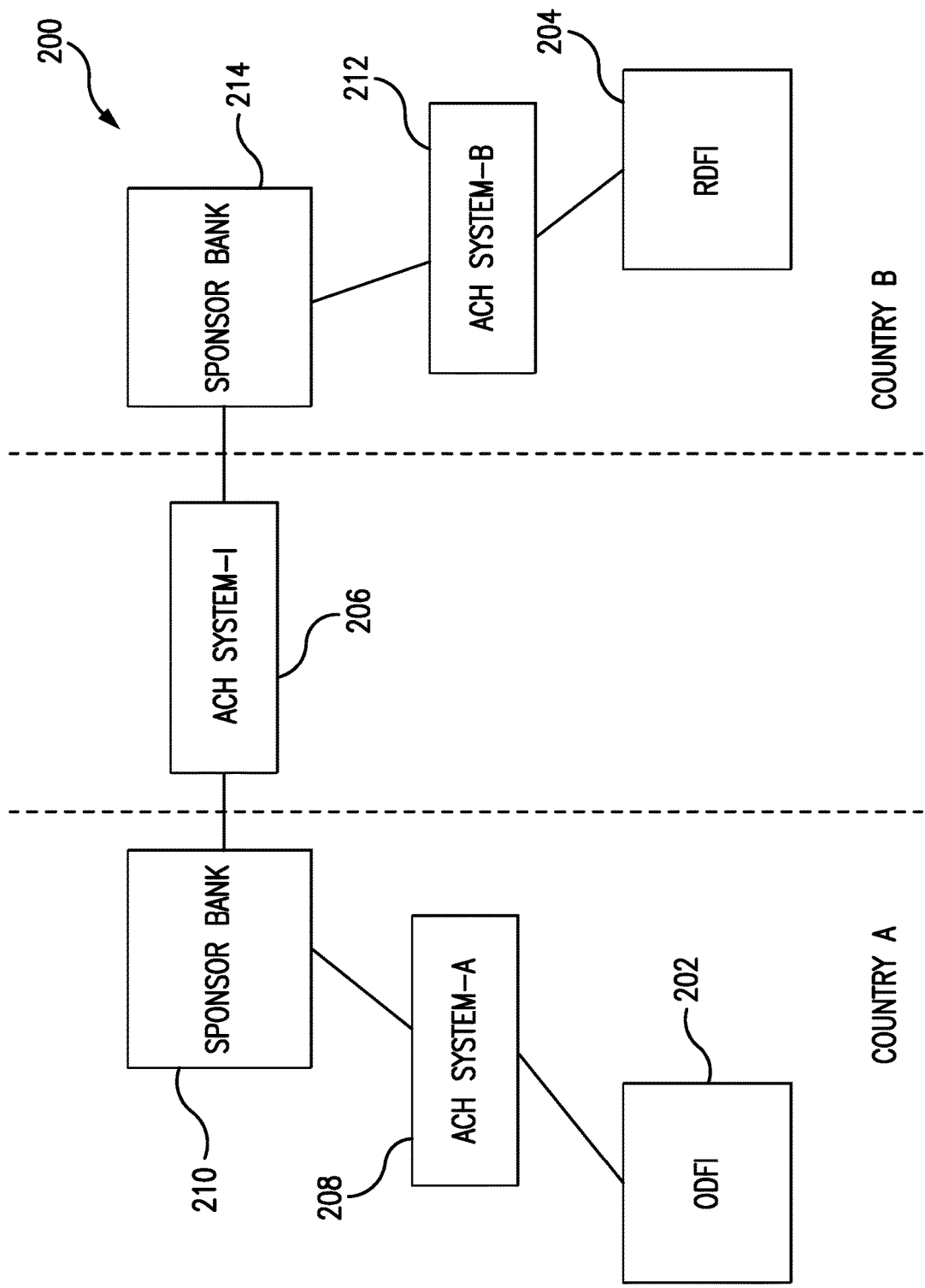
FIG. 2 is a block diagram of an embodiment of an ACH (automated clearing house) system according to a certain transaction use case.

FIG. 2 is a block diagram of an embodiment of an ACH system 200 according to one transaction use case.

In this transaction use case, neither the ODFI 202 nor the RDFI 204 is a member of the ACH-I (ACH-international; also referred to as "cross-border") system 206.

As before, it is assumed that in the use case of FIG. 2, a funds transfer is to be made from a sender's account at the ODFI 202 to the recipient's account at the RDFI 204. Also as before, it is assumed that the ODFI 202 is in Country A and the RDFI 204 is in Country B.

Other system components shown in FIG. 2 include: the Country A domestic ACH system 208; the Country A sponsor bank 210 (which is a member of the ACH-I system 206); the Country B domestic ACH system 212; and the Country B sponsor bank 214 (which is a member of the ACH-I system 206. In the use case illustrated in FIG. 2, three successive ACH transactions implement the desired funds transfer; the three are—(1) a first transaction from ODFI 202 to the Country A sponsor bank 210 via the Country A ACH system 208; (2) a second transaction from the Country A sponsor bank 210 to the Country B sponsor bank 214 via the ACH-I system 206; and (3) a third transaction from the Country B sponsor bank 214 to the RDFI 204 via the Country B ACH system 212.

Settlement between the ODFI and the sponsor bank 210 occurs via the Country A ACH system. Settlement between the sponsor bank 214 and the RDFI occurs via the Country B ACH system. Settlement between the sponsor banks 210 and 214 occurs via the cross-border ACH system (ACH-I).

It will be appreciated that in a system like that illustrated in FIG. 2, there may be numerous FIs that may serve, from transaction to transaction, as either an ODFI or an RDFI. The system may include a respective sponsor bank in each country served by the ACH-I system 206, and the ACH-I system 206 may serve many countries. It is also assumed that each country served by the ACH-I system 206 may have a respective domestic ACH system.

Each of the ACH systems shown in FIG. 2 should be understood to include one or more electronic data communication channels (not separately shown).

Figure 3:
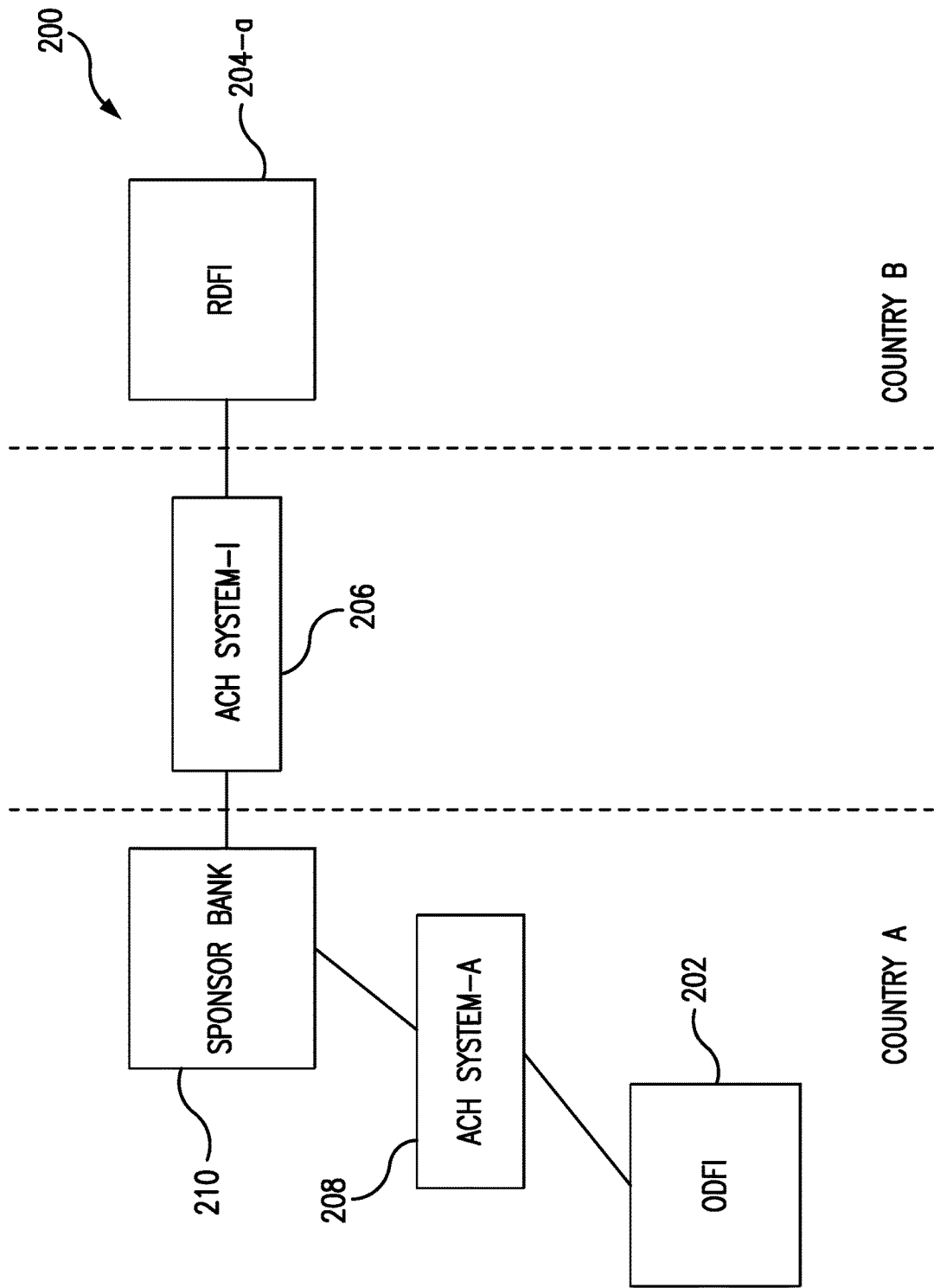
FIG. 3 is a diagram of the ACH system of FIG. 2 according to another transaction use case.

FIG. 3 illustrates another transaction use case for the system 200. In this use case, the RDFI 204-*a* is a member of the ACH-I system 206, but—as before—the ODFI 202 is not a member of the ACH-I system 206. In this use case, two successive ACH transactions implement the desired funds transfer, namely (1) a first transaction from ODFI 202 to the Country A sponsor bank 210 via the Country A ACH system 208; and (2) a second transaction from the Country A sponsor bank 210 to the RDFI 204-*a*. via the ACH-I system 206.

Figure 4:
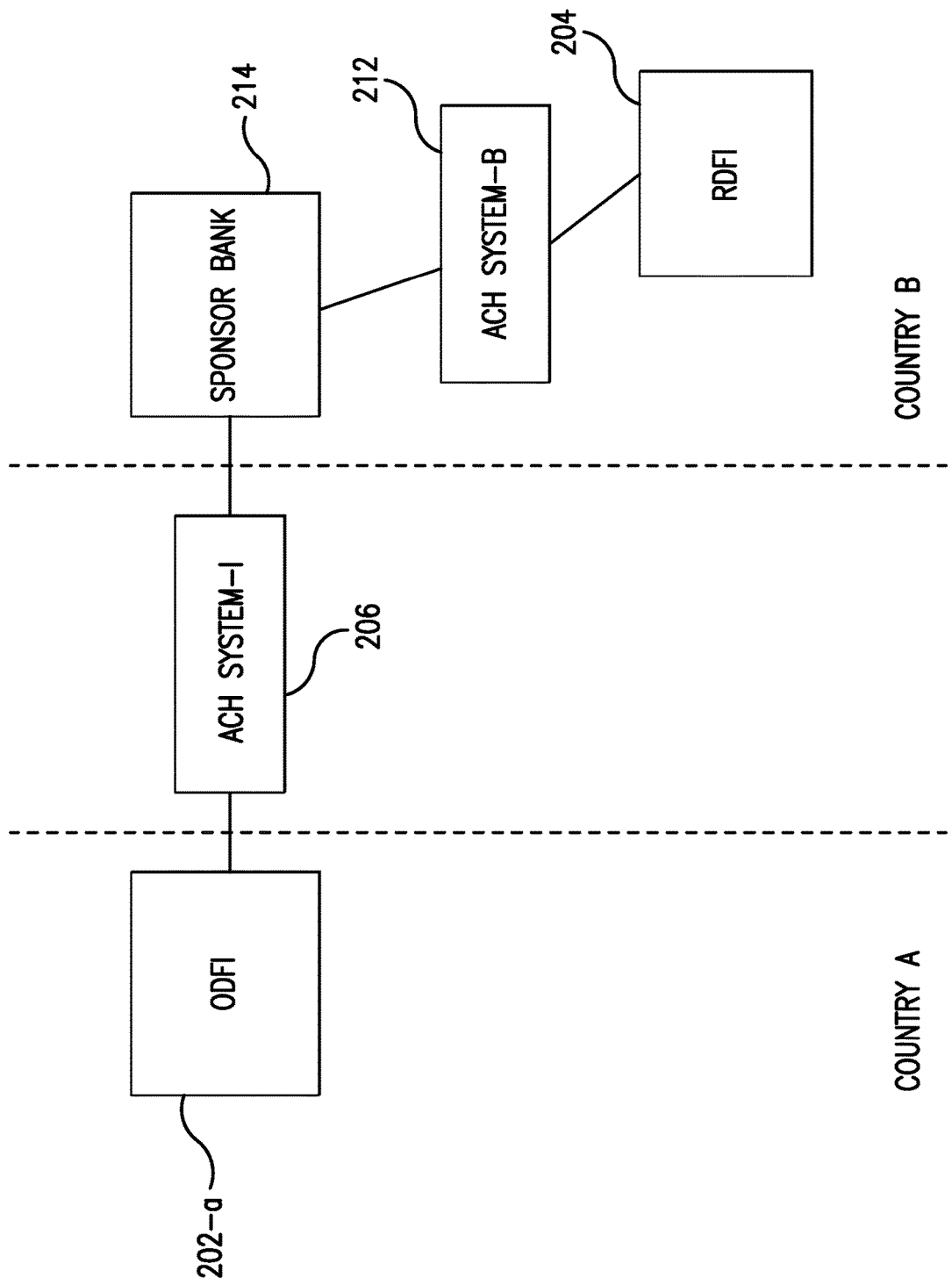
FIG. 4 is a block diagram of the ACH system of FIGS. 2 and 3 according to still another use case.

FIG. 4 illustrates still another use case for the system 200. In this use case, the ODFI 202-*a* is a member of the ACH-1 system 206, but the RDFI 204 is not a member of the ACH-I system 206. In this use case, two successive ACH transactions implement the desired funds transfer, namely (1) a first transaction from ODFI 202-*a* to the Country B sponsor bank 214 via the ACH-I system 206; and (2) a second transaction from the Country B sponsor bank 214 to the RDFI 204 via the Country B ACH system 212.

Figure 5:
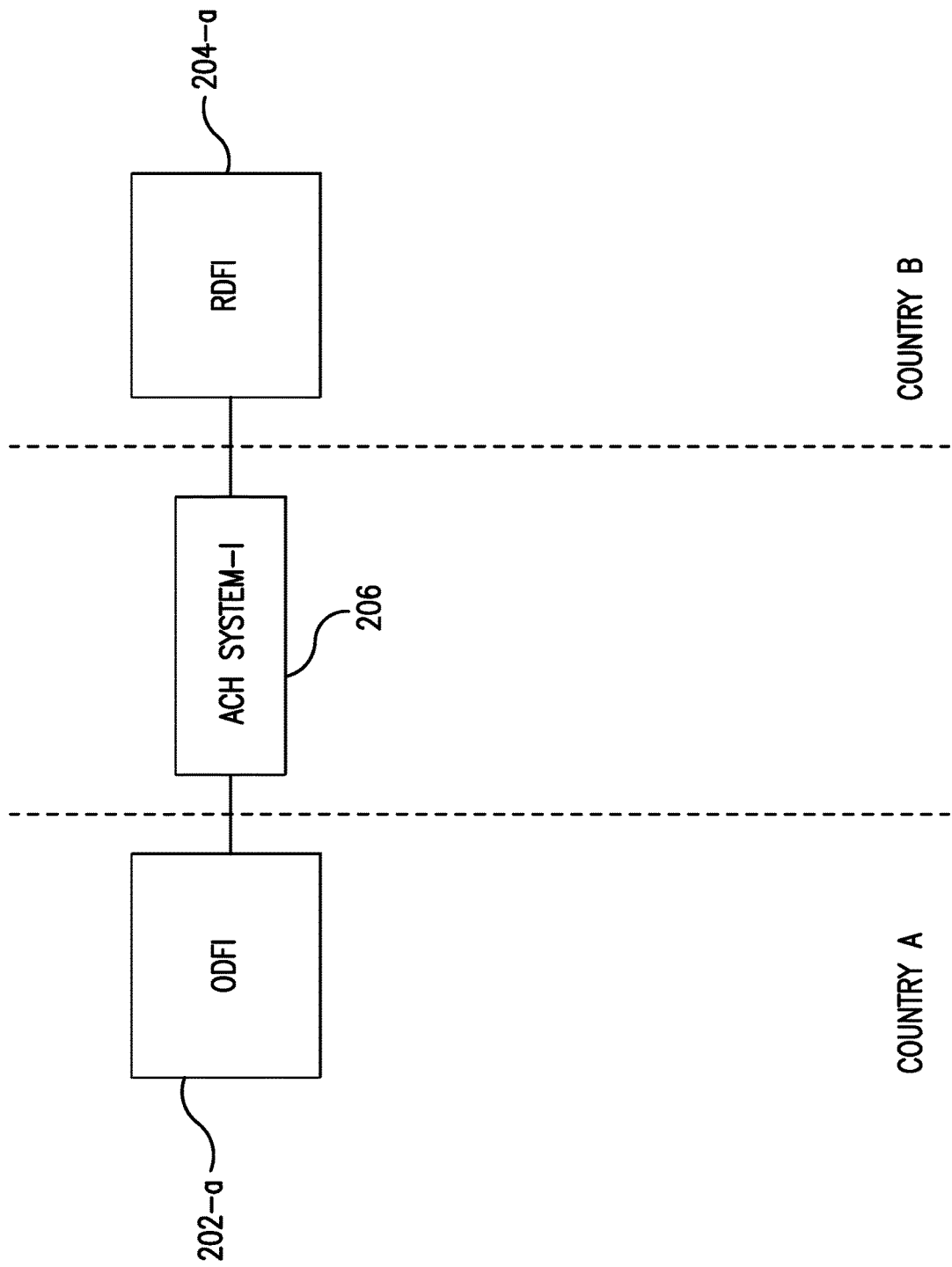
FIG. 5 is a block diagram of the ACH system of FIGS. 2-4 according to yet another use case.

FIG. 5 illustrates yet another use case for the system 200. In this use case, the ODFI 202-*a* and the RDFI 204-*a* are both members of the ACH-I system 206 and the transaction is executed by a single ACH transaction via the ACH-I system 206. The execution of this transaction may resemble a conventional domestic U.S. ACH transaction with settlement managed by the ACH-I system operator.

It should be understood that each block shown in FIGS. 2-5, in addition to representing an entity or system component, may also represent one or more computers to implement functions performed by the entity or system component.

Figure 6:
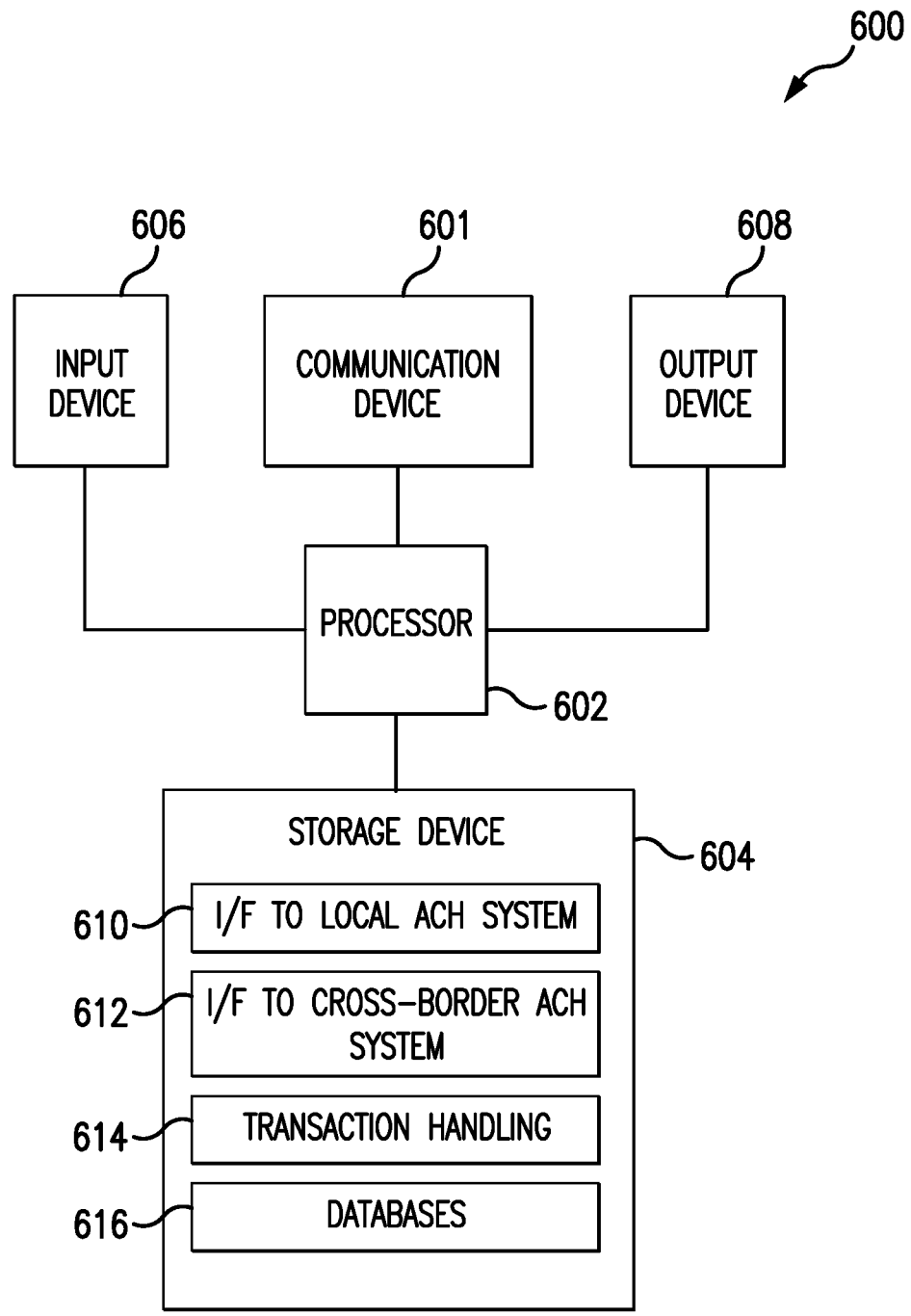
FIG. 6 is a block diagram illustrating a computer system that may perform functions in the system of FIGS. 2-5 in accordance with some aspects of the disclosure.

FIG. 6 is a block diagram illustrating a computer system 600 that may perform functions in the system of FIGS. 2-5 in accordance with some aspects of the disclosure. In particular, the computer system 600 may be operated by one of the sponsor banks, say sponsor bank 210, and accordingly may be referred to as a "sponsor bank computer." The sponsor bank computer 600 may, in its hardware aspects, resemble a typical server computer and/or mainframe computer, but may be controlled by software to cause it to function as described herein. In addition, the sponsor bank computer 600 may be designed as a special purpose computer, and thus specially configured to perform the functions described herein.

The sponsor bank computer 600 may include one or more processor(s) 602 operatively coupled to a communication device 601, a storage device 604, an input device 606 and an output device 608. The communications device 601, the storage device 604, the input device 606 and the output device 608 may all be in communication with and/or operably connected to the processor(s) 602. The processor(s) 602 operate to execute processor-executable steps, contained in program instructions described below, so as to control the sponsor bank computer 600 to provide desired functionality.

Communication device 601 may be used to facilitate communication with, for example, other devices (such as devices that are components of a domestic ACH system and an international ACH system). Communication device 601 may comprise numerous communication ports (not separately shown), to allow the sponsor bank computer 600 to engage in communications as required to simultaneously handle numerous funds transfer transactions. Via the communication device 601, the sponsor bank computer 600 may be electronically coupled to domestic and cross-border ACH systems.

Input device 606 may comprise one or more of any type of peripheral device typically used to input data into a computer. For example, the input device 606 may include a keyboard and a mouse. Output device 608 may comprise, for example, a display and/or an audio speaker, and/or a printer.

Storage device 604 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as flash memory and the like. Any one or more of such information storage devices may be considered to be a non-transitory computer-readable storage medium or a computer usable medium or a memory.

Storage device 604 stores one or more programs for controlling the processor(s) 602. The programs comprise program instructions (which may be referred to as computer readable program code means) that contain processor-executable process steps of the sponsor bank computer 600, executed by the processor(s) 602 to cause the sponsor bank computer 600 to function as described herein.

The programs may include one or more conventional operating systems (not shown) that control the processor(s) 602 so as to manage and coordinate activities and sharing of resources in the sponsor bank computer 600, and to serve as a host for application programs (described below) that run on the sponsor bank computer 600.

The programs stored in the storage device 604 may include, for example, a software interface 610 to facilitate communication between the sponsor bank computer 600 and the local ACH system.

Another program that may be stored in the storage device 604 is a software interface 612 to support communication between the sponsor bank computer 600 and the international ACH system (ACH-I 206).

The storage device 604 may also store a transaction handling application program 614. The transaction handling application program 614 may control the processor(s) 602 to enable the sponsor bank computer 600 to facilitate funds transfers in a manner as described herein.

The storage device 604 may also store, and the processor(s) 602 may also execute, other programs, which are not shown. For example, such programs may include communications software and one or more reporting applications. The latter program(s) may respond to requests from system administrators, for example, for reports on the activities performed by the sponsor bank computer 600. The other programs may also include, for example, device drivers, database management software, and the like.

In addition, the storage device 604 may store one or more databases 616 that may be required for operation of the sponsor bank computer 600.

It should be understood that other computerized components of the system 200 may be constituted by computer hardware having the same types of components and/or hardware architecture as described herein with reference to FIG. 6.

Figure 7:
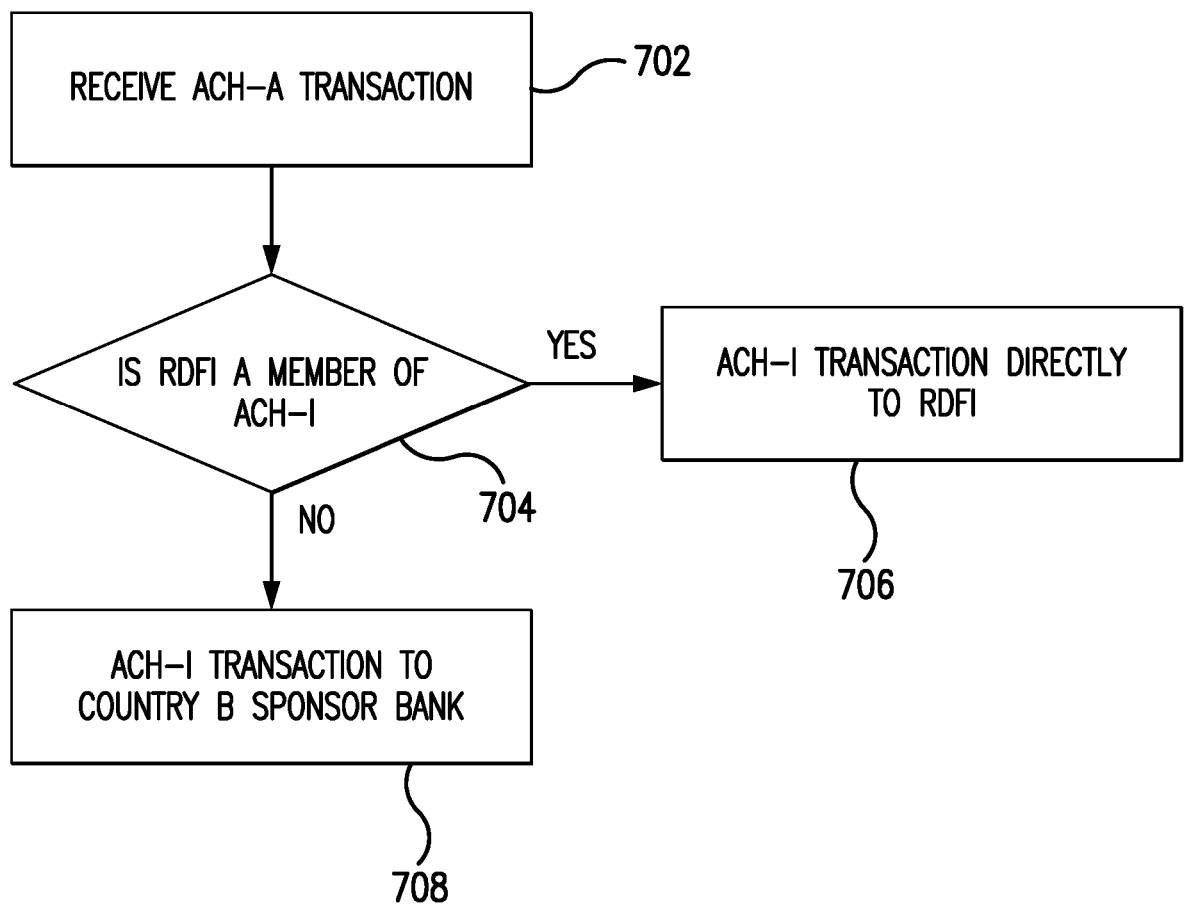
FIG. 7 is a flow chart that illustrates a process that may be performed in the system of FIGS. 2-5 in accordance with some aspects of the disclosure.

FIG. 7 is a flow chart that illustrates a process that may be performed in the system 200 in accordance with some embodiments of the disclosure. Primarily, the process of FIG. 7 may be performed by the sponsor bank computer 600.

At 702 in FIG. 7, the sponsor bank computer 600 may receive an ACH transaction via the Country A ACH system 208, from the ODFI 202. The ACH transaction received at 702 may include messaging that indicates the RDFI and the recipient's account number. The messaging may also include one or more instructions as to how rapidly downstream ACH transactions are to be performed, or other details regarding execution of downstream ACH transactions.

A decision block 704 may follow block 702 in the process of FIG. 7. At decision block 704, the sponsor bank computer 600 may determine whether the RDFI 204/204a for the desired funds transfer is a member of the ACH-I system 206. If so, then block 706 may follow decision block 704. At block 706, the sponsor bank computer 600 engages in an ACH transaction via the ACH-I system 206 to complete the desired funds transfer directly to the RDFI. It will be appreciated that block 706 corresponds to the use case illustrated in FIG. 3.

Returning to decision block 704, if a negative determination is made at that decision block (i.e., if the sponsor bank computer 600 determines that the RDFI is not a member of the ACH-I system 206), the block 708 may follow decision block 704. At block 708, the sponsor bank 600 engages in an ACH transaction via the ACH-I system 206 with the sponsor bank 214 for the country where the RDFI is located. The messaging included in the latter ACH transaction may indicate—to the sponsor bank 214—the RDFI and the recipient's account number at the RDFI. The messaging may also include one or more instructions as to how rapidly a downstream ACH transaction is to be performed, or other details regarding execution of the downstream ACH transaction. It can then be assumed that the sponsor bank 214 will complete the desired funds transfer via a domestic ACH transaction to the RDFI. It will be noted that block 708 corresponds to the use case illustrated in FIG. 2. In this context, and other similar contexts herein, the messaging that indicates the RDFI and recipient's account number may be referred to as "addressing messaging".

Regarding the use case illustrated in FIG. 4, it will be understood that the sponsor bank 214 in Country B receives an ACH transaction via the ACH-I system 206, originating directly from ODFI 202-a in Country A. Messaging associated with that ACH transaction indicates the RDFI and the recipient's account number at the RDFI. The sponsor bank 214 then executes a domestic ACH transaction to the RDFI 204 via the Country B ACH system 212 to complete the desired funds transfer.

Turning to the use case illustrated in FIG. 5, the desired funds transfer is accomplished by a single ACH transaction directly from the ODFI 202-a to the RDFI 204-a via the ACH-I system 206. The execution of the ACH transaction in this case may resemble a typical domestic ACH transaction, except that a cross-border ACH system (i.e., the system 206) is involved instead of a domestic ACH system.

With a funds transfer system as illustrated herein, settlement of the transfers occurs promptly and transparently, and with greater convenience as compared to settlement via correspondent banking arrangements.

The above descriptions and illustrations of processes herein should not be considered to imply a fixed order for performing the process steps. Rather, the process steps may be performed in any order that is practicable, including the omission of one or more steps and/or the simultaneous performance of at least some steps.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

Although the present disclosure has described certain specific exemplary embodiments, it should be understood that various changes, substitutions, and alterations would be apparent to those skilled in the art and can be made to the disclosed embodiments without departing from the spirit and scope of the disclosure as set forth in the appended claims.

What is claimed is:

1. A method comprising:
    receiving a first ACH (automated clearing house) transaction by a first sponsor bank in a first country from an originating bank in the first country to transfer funds from an account at the originating bank to a recipient's account number at a receiving bank, the first ACH transaction being received by a first domestic ACH system operative in the first country and the received first ACH transaction containing addressing messaging that indicates the receiving bank and the recipient's account number at the receiving bank, with a settlement of the funds transferred from the originating bank in the first country to the first sponsor bank in the first country being independently performed by the first domestic ACH system;
    executing, in response to receiving the first ACH transaction from the first sponsor bank to transfer funds from the account at the originating bank to the recipient's account number at the receiving bank, a second ACH transaction from the first sponsor bank in the first country to a second sponsor bank located in a second country different from the first country, the second ACH transaction including addressing messaging containing the account number to identify the recipient's account and indicating the receiving bank in the second country to receive a third ACH transaction to be executed from the second sponsor bank in the second country to the receiving bank located in the second country to benefit the recipient's account at the receiving bank located in the second country, the second ACH transaction being executed by a second international ACH system different from the first domestic ACH system and operating internationally, with a settlement of the funds transferred from the first sponsor bank in the first country to the second sponsor bank in the second country being independently performed by the second international ACH system; and executing, in response to the execution of the second ACH transaction to transfer funds from the account at the originating bank to the recipient's account number at the receiving bank, the third ACH transaction from the second sponsor bank in the second country to the receiving bank located in the second country to benefit the recipient's account at the receiving bank, with a settlement of the funds transferred from the second sponsor bank in the second country to the receiving bank in the second country being independently performed by a third domestic ACH system.

2. The method of claim 1, wherein the first ACH system includes electronic data communication channels in the first country.

3. The method of claim 1, wherein the second ACH system includes at least one electronic data communication channel that supports electronic data messaging between the first country and the second country.

4. The method of claim 1, wherein the receiving of the first ACH transaction and the executing of the second ACH transaction are performed by a computer operated by the first sponsor bank.

5. The method of claim 4, wherein the computer is electronically coupled to the first ACH system and the second ACH system.

6. The method of claim 1, wherein the addressing messaging also includes at least one instruction concerning a downstream ACH transaction.

7. The method of claim 6, wherein the instruction indicates how rapidly the at least one downstream ACH transaction is to be performed.

8. A method comprising:

receiving, from an originating bank in a first country, a first ACH (automated clearing house) transaction by a sponsor bank located in a second country different from the first country to transfer funds from an account at the originating bank to a recipient's account at a receiving bank in the second country, the first ACH transaction being received by a first international ACH system that operates internationally, the first ACH transaction including addressing messaging indicating the receiving bank in the second country and the recipient's account to be benefitted from a second ACH transaction, with a settlement of the funds transferred from the originating bank in the first country to the sponsor bank in the second country being independently performed by the first international ACH system; and executing, in response to receiving the first ACH transaction from the originating bank in the first country to transfer funds from the account at the originating bank to the recipient's account number at the receiving bank in the second country, a second ACH transaction from the sponsor bank to the receiving bank in the second country, and the second ACH transaction is executed by a second domestic ACH system operative in the second country and different from the first international ACH system, wherein the receiving of the first ACH transaction and the executing of the second ACH transaction are performed by a computer operated by the sponsor bank in the second country, with a settlement of the funds transferred from the sponsor bank in the second country and the receiving bank in the second country being independently performed by the second domestic ACH system.

9. The method of claim 8, wherein the first ACH system includes at least one electronic data communication channel that supports electronic data messaging between the first country and the second country.

10. The method of claim 8, wherein the second ACH system includes electronic data communication channels in the second country.

11. The method of claim 8, wherein the computer is electronically coupled to the first ACH system and the second ACH system.

* * * * *